United States Patent
Rao et al.

(10) Patent No.: US 11,871,161 B1
(45) Date of Patent: Jan. 9, 2024

(54) DISPLAY WITH COMPRESSED CALIBRATION DATA

(71) Applicant: Meta Platforms Technologies, LLC, Menlo Park, CA (US)

(72) Inventors: Pravin Rao, San Jose, CA (US); Edward Buckley, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 329 days.

(21) Appl. No.: 17/332,926

(22) Filed: May 27, 2021

(51) Int. Cl.
| | |
|---|---|
| G02B 27/00 | (2006.01) |
| G02B 27/01 | (2006.01) |
| G06F 3/01 | (2006.01) |
| H04N 9/31 | (2006.01) |
| H04N 17/00 | (2006.01) |
| G06V 40/18 | (2022.01) |

(52) U.S. Cl.
CPC ............ *H04N 9/3191* (2013.01); *G06F 3/013* (2013.01); *G06V 40/193* (2022.01); *H04N 9/3182* (2013.01); *H04N 17/004* (2013.01)

(58) Field of Classification Search
CPC .... G02B 27/017; G02B 27/01; H04N 9/3191; H04N 9/3182; H04N 17/004; G06V 40/193; G06F 3/013
See application file for complete search history.

(56) References Cited

U.S. PATENT DOCUMENTS

| | | | |
|---|---|---|---|
| 10,861,415 B2 * | 12/2020 | Fu | G02B 6/0036 |
| 11,156,829 B2 * | 10/2021 | Zhang | G02B 27/0093 |
| 2019/0041634 A1 * | 2/2019 | Popovich | G02B 6/00 |
| 2023/0038781 A1 * | 2/2023 | Ryu | G02B 27/0093 |

* cited by examiner

*Primary Examiner* — Lixi C Simpson
(74) *Attorney, Agent, or Firm* — Pequignot + Myers; Matthew A. Pequignot

(57) ABSTRACT

A display device and a calibration method for the display device are provided. The calibration method includes obtaining calibration coefficients, from which a compressed approximation is determined. The display device obtains the compressed approximation data including basis vectors and reconstruction coefficients, and determines calibration data to at least partially offset a dependence of an optical throughput of the display device on a beam angle and a beam coordinate at the eyebox.

20 Claims, 10 Drawing Sheets

Red Channel Correction Map Before Compression

Red Channel Correction Map After Compression

Green Channel Correction Map Before Compression

Green Channel Correction Map After Compression

Blue Channel Correction Map Before Compression

Blue Channel Correction Map After Compression

DISPLAY WITH COMPRESSED CALIBRATION DATA

TECHNICAL FIELD

The present disclosure relates to visual displays and display systems, and in particular to wearable displays, display systems, and methods for their operation, calibration, and maintenance.

BACKGROUND

Visual displays are used to provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems are intended for individual users. Visual displays are viewed either directly, or by means of special glasses that may include optical shutters, as well as special varifocal lenses.

An artificial reality system generally includes a near-eye display (e.g., a headset or a pair of glasses) configured to present content to a user. A near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed onto surrounding environment. In some near-eye displays, each eye of the user views an image in linear domain displayed by a projector and replicated by a pupil replicator.

It is desirable to reduce size and weight of a head-mounted display. Lightweight and compact near-eye displays reduce the strain on user's head and neck, and are generally more comfortable to wear. Oftentimes, an optics block of a wearable display is the bulkiest and heaviest module of the display, especially when the optics block includes bulk optics such as refractive lenses and cube beamsplitters. Compact planar optical components, such as waveguides, gratings, Fresnel lenses, etc., are sometimes used to reduce the size and weight of the optics block. However, compact planar optics may be prone to distortions, non-uniformity, ghosting, residual coloring, and other drawbacks, which hinder their use in wearable optical display systems.

BRIEF DESCRIPTION OF THE DRAWINGS

Exemplary embodiments will now be described in conjunction with the drawings, in which.

DETAILED DESCRIPTION

Figure 1:
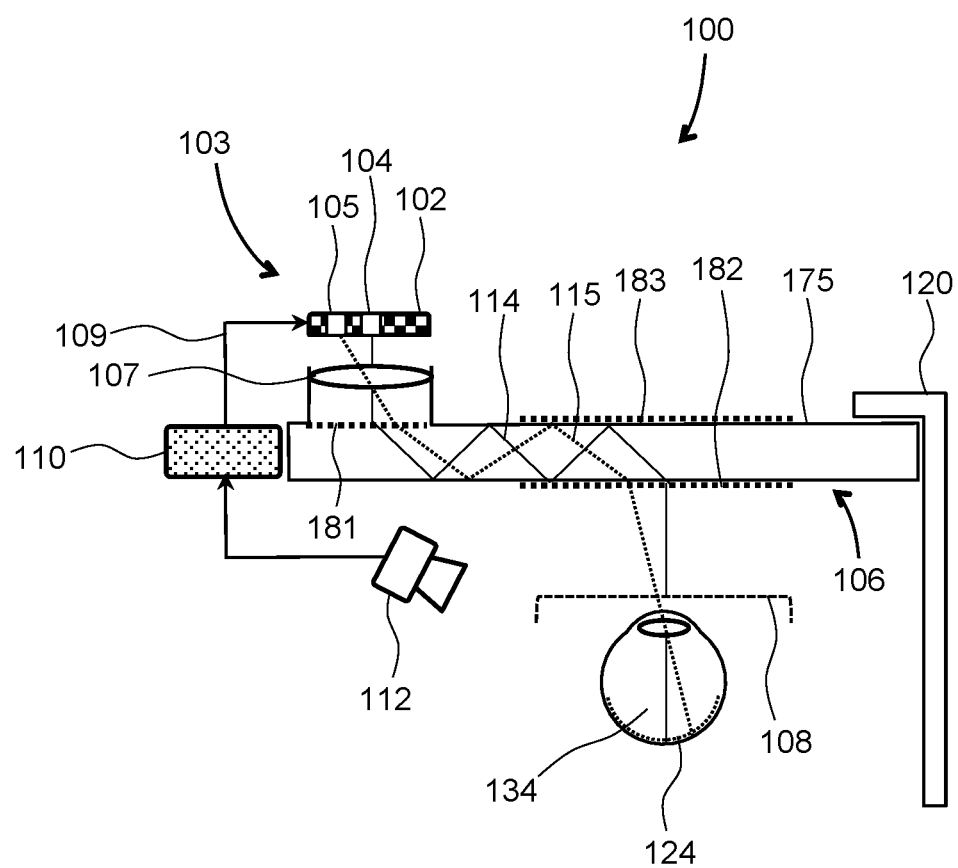
FIG. 1 is a schematic top view of a display device in accordance with the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

In accordance with the present disclosure, there is provided a display device comprising a projector for providing image light carrying an image in angular domain for displaying by the display device, a pupil expander operably coupled to the projector for relaying the image light to an eyebox of the display device, and a controller operably coupled to the projector. Optical throughput of the pupil expander has a dependence on a beam angle and a beam coordinate at the eyebox. The controller is configured to: obtain basis vectors and reconstruction coefficients representing a compressed approximation of the dependence; determine calibration data from the basis vectors and reconstruction coefficients, for applying to the image to at least partially offset the dependence; and apply the calibration data to the image.

The controller may be operably coupled to the eye tracking system and configured to adjust the distribution of optical power density of the channel depending on the one of position or orientation of the user's eye determined by the eye tracking system, to at least partially offset the dependence of throughput on the beam coordinate or angle at the eyebox. The channel may include at least one of a color channel, color coordinate(s), or a luminance (luma, brightness, etc.) channel.

When the image light comprises not one but a plurality of color channels, the throughput of the waveguide pupil expander for each color channel may have an angular dependence, whereby the waveguide pupil expander may have an angular-dependent color transfer function variation. In such embodiments, the controller may be configured to adjust the distribution of optical power density of at least one of the plurality of color channels to at least partially offset the angular-dependent color transfer function variation of the waveguide pupil expander. An eye tracking system may be provided for determining the position of a user's eye pupil at the eyebox, and the controller may be operably coupled to the eye tracking system and configured to adjust the distribution of optical power density of the at least one of the plurality of color channels depending on the at least one of position or orientation of a user's eye and/or the position of the eye pupil determined by the eye tracking system.

In accordance with an aspect of the present disclosure, there is further provided a calibration system for calibrating a display device comprising a projector for providing image light carrying an image in angular domain, and a pupil expander operably coupled to the projector for relaying the image light to an eyebox of the display device. The calibration system comprises: a test camera for receiving the image light from the pupil expander, wherein the pupil expander or the test camera is movable to change a position of the test camera at the eyebox; and a test controller operably coupled to the test camera and the display device. The test controller is configured to: cause the display device to display a calibration frame; determine a dependence of optical throughput of the pupil expander on a beam angle and a beam coordinate at the eyebox, comprising obtaining at least one image of the calibration frame with the test camera; determine basis vectors and reconstruction coefficients representing a compressed approximation of the dependence; and store the basis vectors and the reconstruction coefficients for subsequent access by the display device.

In accordance with another aspect of the present disclosure, there is further provided a method in a display device comprising a projector for providing image light carrying an image in angular domain, and a pupil expander operably coupled to the projector for relaying the image light to an eyebox of the display device. The method comprises: obtaining basis vectors and reconstruction coefficients representing a compressed approximation of a dependence of optical throughput of the pupil expander on a beam angle and a beam coordinate at the eyebox; obtaining calibration data from the basis vectors and reconstruction coefficients, for applying to the image to at least partially offset the dependence; and applying the calibration data to the image.

Referring now to FIG. 1, a display device 100 of the present disclosure includes an image projector 103 for providing image light carrying an image in angular domain for displaying by the display device 100. A pupil expander 106 is operably coupled to the projector 103 for relaying the image light, which is illustrated by light beams 114 and 115, to an eyebox 108 of the display device 100. Optical throughput of the pupil expander 106 has a dependence on a beam angle and a beam coordinate at the eyebox 108.

In the embodiment shown, the image projector 103 includes an electronic display panel 102 coupled to a lens 107. The electronic display panel 102 includes a plurality of pixels including first 104 and second 105 pixels. The lens 107 converts a coordinate of the pixel into an angle of an output light beam. The image projector 103 provides a plurality of beams at different beam angles, each beam corresponding to a particular pixel of the electronic display panel 102. For example, first 114 and second 115 light beams shown with solid and dotted lines respectively originate from first 104 and second 105 pixels respectively. The optical power levels of the plurality of beams are in accordance with image data 109 received by the electronic display panel 102 from an image source, e.g. from a controller 110 operably coupled to the image projector 102.

The image light carries an image in angular domain, where different angles of light beams of the image light correspond to different coordinates of pixels displayed by the electronic display panel 102. In the above example, different angles of the first 114 and second 115 light beams correspond to coordinates (i.e. row numbers and column numbers) of the first 104 and second 105 pixels. In general, the image light includes at least one channel, i.e., a luminance channel and/or at least one color channel. Typically, three color channels are provided for a full-color display. Each channel corresponds to a particular color component of the image to be displayed by the projector 103.

The pupil expander 106 is configured to receive the image light and to provide a plurality of light beams to the eyebox 108 of the display device 100, while preserving the angular distribution of optical power density and color of the image light. The image projector 103 and the pupil expander 106 may be supported by a body 120. The pupil expander 106 is optically coupled to the image projector 103.

The pupil expander 106 may include a waveguide 175 having an in-coupling diffraction grating 181, an out-coupling diffraction grating 182, and a pupil expansion diffraction grating 183. The in-coupling diffraction grating 181 receives the image light, which then propagates in the waveguide 175 in a zigzag pattern diffracting in turns on the pupil expansion diffraction grating 183 and the out-coupling diffraction grating 182. At each diffraction on the out-coupling diffraction grating 182, a portion of the image light exits the waveguide 175 as shown and may reach the user's eye 134. Accordingly, the pupil expander 106 enables the display device 100 to provide an image in angular domain at all locations of the eye 134 in the eyebox 108, ensuring that different users with different interpupillary distances and different locations of the eyes relative to the eyebox 108 can still see an image of an acceptable quality.

As explained above, the lens 107 between the display panel 102 and the pupil expander 106 converts pixel coordinates into corresponding beam angles of the plurality of light beams. For example, an angle of the first light beam 114 at the eyebox 108 corresponds to a coordinate of the corresponding first pixel 104 of the electronic display panel 102, and an angle of the second light beam 115 at the eyebox 108 corresponds to a coordinate of the corresponding second pixel 105 of the electronic display panel 102. It can be seen that the angle of the first 114 or second 115 light beam corresponds to a coordinate on a retina 124 of the user's eye 134. In this manner, the coordinates of the first 104 and second 105 pixels of the image projector 102 correspond to locations on the retina 124 of the user's eye 134, enabling the user to see the image in angular domain displayed by the image projector 102. The throughput of the pupil expander 106 has a dependence on a beam angle of the light beam at the eyebox 108, meaning that the throughput values for the first 114 and second 115 light beams can be different.

Other types of image projector, for example and without limitation scanning projectors, may also be used. In a scanning projector, a collimated beam of light is scanned through an angular scanning range, and brightness and/or color of the collimated beam is varied as the beam is scanned.

Multiple optical paths of the image light within the pupil expander 106 may cause the optical throughput of the pupil expander 106 to have a dependence on a beam angle and/or a beam coordinate at the eyebox 108. In other words, the optical power of a light beam carried by the pupil expander 106 to the eyebox 108 may depend on an angle of the light beam at the eyebox 108. As noted above, the beam angle at the eyebox 108 corresponds to a coordinate of a pixel in the image to be displayed. Accordingly, the controller 110 may be configured to modify the image data 109 to at least partially offset the dependence of the throughput of the pupil expander on the beam angle or beam coordinate at the eye box, e.g., by pre-emphasizing the image to be displayed in areas of low throughput, attenuating the image in areas of high throughput, or both. The dependence of the throughput on the beam coordinate results in the display 100 calibration data being dependent on position of the eye 134, or more precisely a pupil of the eye 134, in the eyebox 108.

The display device 100 may further include an eye tracking system 112 for determining at least one of location and orientation of the user's eye 134 at the eyebox 108, enabling the determination a position of the eye's pupil at the eyebox. The controller 110 may be operably coupled to the eye tracking system 112 and configured to modify the image data 109 to adjust the distribution of optical power density of the channel depending on the location and/or orientation of the user's eye defining the position of the eye pupil, to at least partially offset the dependence of the throughput on the coordinate of the light beam.

In embodiments where the electronic display panel 102 is a color display panel, i.e., when the image light provided by the electronic display panel 102 comprises a plurality of color channels, the throughput of the pupil expander 106 may have a different dependence on the coordinate and the angle of the light beam specific to each color channel. The total dependence may be represented as a combination of the per-channel dependencies, and may cause color shift varying across the image and depending on position of the eye 134 in the eyebox 108. In such embodiments, the controller 110 may be configured to update the image data 109 on per color channel basis, that is, differently for each color channel, if needed. The image data 109 are updated by the controller 110 to at least partially offset the dependence of the throughput of the pupil expander 106 on the coordinate and the angle of the light beam for each color channel, by taking into account the position of the user's eye 134 determined by the eye tracking system 112. The controller 110 may be configured to adjust the distribution of optical power density of the at least one of the R, G, B color channels, or a brightness component and channel color components, depending on the position of the user's eye 134 determined by the eye tracking system 112.

For embodiments where the performance of the pupil expander 106 is described by a color transfer function dependent on the eye pupil position, the controller 110 may be configured to obtain an image to be displayed by the display device 100, and to modify a color distribution of the image to at least partially offset the color transfer function of the pupil expander 106 at the pupil position determined by the eye tracking system 112. A memory, e.g., an on-board non-volatile memory, may be provided in the display device 100, for storing data for modifications of the color channels of the image at each pupil position at the eyebox 108. The controller 110 may be operably coupled to the memory for retrieving at least a portion of the data corresponding to the pupil position determined by the eye tracking system 112, for modifying the color distribution of the image to at least partially offset the angular-dependent color transfer function variation of the pupil expander 106. The display device 100 may need to be calibrated to offset the dependence of optical throughput of the pupil expander on beam parameters such as angle or coordinate of the beam.

Figure 2:
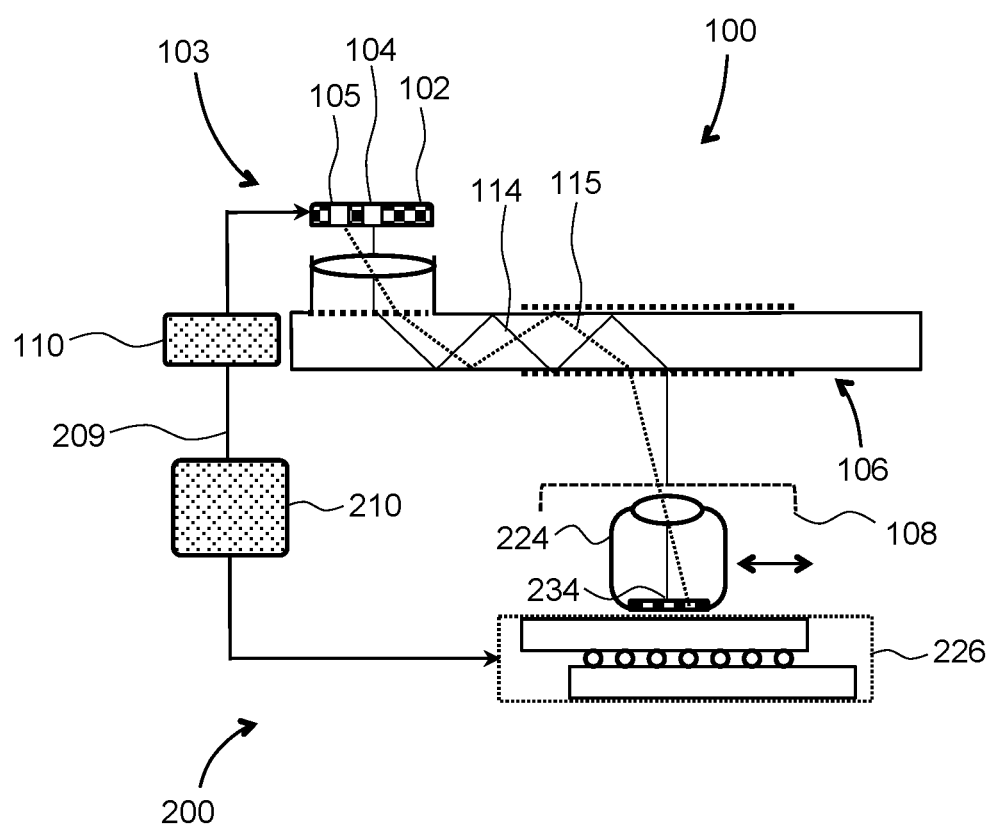
FIG. 2 is a schematic top view of a calibration system for the display device of FIG. 1.

Turning to FIG. 2, a calibration system 200 can be used to calibrate a display device such as the display device 100. The calibration system 200 includes a test camera 224 for receiving image light from a pupil expander of the display device under calibration, such as the pupil expander 106 (FIG. 1). The test camera 224 or the pupil expander 106 is movable, to change a relative position of the test camera 224 at the eyebox 108. The test camera 224 may be mounted on a platform 226 to move the test camera 224 in the eyebox 108. The test camera 224 may be constructed to closely mimic a human eye in its performance. For example, the test camera 224 may include a constant or variable input pupil having a pupil diameter or diaphragm matching the pupil diameter (or a range of pupil diameters) of a human eye, an angle of view similar to that of a human eye, etc. The platform 226 may be a movable platform, a tiltable platform, or both. The movable platform may include X, XY, or XYZ translation stages for translating the test camera 224 in the dimensions of width, height, and depth.

The calibration system 200 further includes a test controller 210 operably coupled to the test camera 224 and the display device 100, via the controller 110 of the display 100 as shown, or directly to the display panel 102 of the image projector 103. The test controller 210 is configured to cause the display device to display a calibration frame and to determine a dependence of optical throughput of the pupil expander 106 on a beam angle and a beam coordinate at the eyebox 108.

The calibration system 200 may be used to test optics blocks, waveguide pupil expanders, and other components of wearable display systems. The calibration method disclosed further below may be implemented to calibrate actual manufactured display devices, by configuring their controllers to perform test and calibration functions using the electronic display panels of the display devices themselves. For these embodiments, the testing apparatus may only require a test camera on a translation/rotation stage in combination with some fixture to place the display device into for the purpose of testing. Herein and throughout the rest of this disclosure, the terms "calibrate pupil expander" and "calibrate the display device" are used interchangeably, because a pupil expander is typically the main source of calibration errors related to brightness and/or color transfer functions of a display device equipped with a pupil expander, especially a waveguide-based pupil expander.

Figure 3:
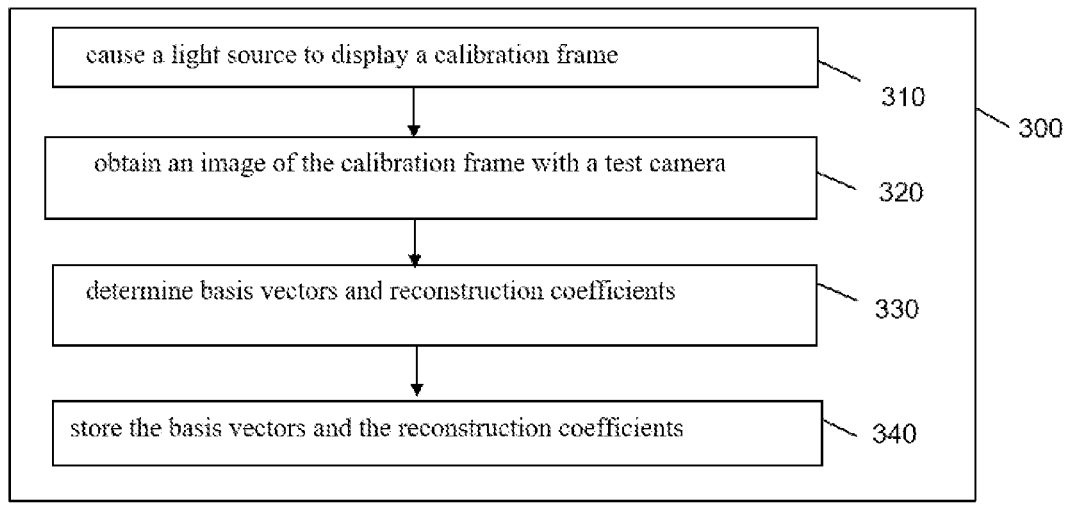
FIG. 3 is a flow chart of a method for calibrating a pupil expander of the display device of FIG. 1 using a calibration system of FIG. 2.

The operation of the calibration system 200 will now be described with reference to FIG. 3 illustrating a method 300 of calibrating the display device 100. The test controller 210 may be configured to perform steps of the calibration method 300. The calibration method 300 includes causing (310) the display device to display a calibration frame, e.g., by sending a command 209 (FIG. 2) to the electronic display panel 102. The image light may include a test pattern, e.g., a grid pattern, a dot pattern, etc., or may be a simple uniform illumination pattern. The image light may include a channel to be calibrated, e.g. a brightness channel, color coordinate(s), etc.

The method 300 (FIG. 3) further includes determining a dependence of optical throughput of the pupil expander 106 on a beam angle and a beam coordinate at the eyebox 108, using at least one image of the calibration frame obtained (320) with the test camera 224. To that end, the controller 210 may send a command to the platform 226 to move the test camera 224 to a first location having an initial position. Further, the test controller 210 may send a command to the test camera 224 to take an image to obtain an angular distribution of optical power density of the channel at the first position at the eyebox 108 of the pupil expander 106. The test controller 210 then determines throughput of the pupil expander 106 for the particular position, i.e., the location or orientation of the test camera 224. The throughput values, output power values, color coordinates, or other values may be used to compute various calibration coefficients for further storage and processing. The calibration coefficients define the dependence so that knowing a coefficient for a particular pixel and particular position at the eyebox, one knows the optical throughput of the pupil expander 106 for that particular pixel and position. By way of example, an optical power throughput calibration coefficient is defined as a ratio of optical power at a pixel 234 of the test camera 224 produced by the first beam 114 to the optical power of the corresponding first pixel 104 displayed by the display panel 102. Instead of the optical power values, another suitable parameter may be used to obtain the calibration coefficients, such as pulse energy for pulsed light sources and projectors, for example.

Then, the test controller 210 may send a command to the platform 226 to move the test camera 224 to a next position, changing the location of the test camera 224 relative to the pupil expander 106. The process of taking an image of the calibration frame and computing the calibration coefficients may then repeat at the new camera 224 position. In this manner, the angular dependence of throughput may be determined at the plurality of positions, also referred to as a grid of positions, of the test camera 224 corresponding to the positions of the user's eye 134 at the eyebox 108 (FIG. 1).

The calibration coefficients obtained for a plurality of test camera positions may be directly used to modify the image light in the display device, to at least partially offset the dependence of the pupil expander on a beam angle and a beam coordinate at the eyebox. The memory requirement for storage of all the calibration coefficients can be quite significant. The calibration needs to be performed for each eye location at the eyebox, and the calibration coefficients may need to be computed and stored for each color channel at each location as calibration maps for both left and right portions of the display device. To lessen the storage requirements, the measured data is compressed in an approximation step 330, and a compressed approximation of the calibration coefficients is stored in a storage step 340 for subsequent use in the display device 100. The approximation step 330 includes the determination of basis vectors and reconstruction coefficients representing a compressed approximation of the dependence of optical throughput of the pupil expander 106 on a beam angle and a beam coordinate at the eyebox 108.

The calibration coefficients obtained at a plurality of positions by taking images (320) of calibration frames may be represented as a matrix of values. The matrix of values may be compressed by scaling and reversibly matrix-transforming the data to have greater variation columns followed by less variation columns, and storing only the columns with greater variation to save storage space. This results in a smaller matrix which approximates the original set of the calibration coefficients, and thus approximates the dependence of the pupil expander on a beam angle and a beam coordinate at the eyebox. The approximating matrix may be stored as basis vectors and reconstruction coefficients, and may require considerably less storage than the entire set of the calibration coefficients.

In order to preserve the main trends of the dependence exhibited by the pupil expander's throughput function, basis vectors of the space formed by the calibration coefficients may be divided in two groups. Basis vectors having variation value(s) above a predefined threshold define a variation subspace. The remaining basis vectors, those with variation equal to or below the threshold, define a subspace complementary to the variation subspace, and are out of consideration. Accordingly, the compressed approximation of the dependence includes only basis vectors having variation value(s) above a predefined threshold. In other words, the basis vectors associated with higher variation and separated from lower variation basis vectors, and reconstruction coefficients corresponding to the higher variation basis vectors, form a compressed approximation of the calibration coefficients obtained in step 320. Thus, the basis vectors and reconstruction coefficients approximate, in a compressed form, the dependence of the pupil expander on a beam angle and a beam coordinate at the eyebox.

Figure 4:
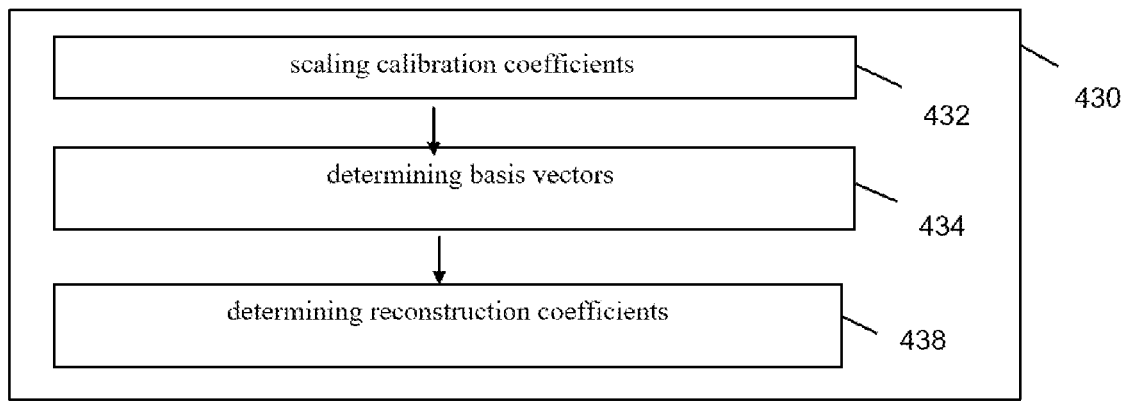
FIG. 4 is a flow chart of an implementation of the compression step 330 of FIG. 3.

FIG. 4 illustrates a possible implementation 430 of the approximation step 330 (FIG. 3), i.e., of a process of obtaining a compressed approximation of the function describing the dependence of the throughput of the pupil expander on the beam angle or beam coordinate at the eye box for a single channel. M denotes the number of positions where the test camera 224 performs measurements, i.e. positions within the eyebox 108, and N denotes the number of pixels (such as pixels 104 and 105, FIG. 2) sampled by the camera at each of the M positions. A matrix of calibration coefficients A(N×M) may be formed of elements A(i,j), i=1 . . . N, j=1 . . . M, wherein a particular element A(i,j) is a calibration coefficient obtained during the measurement step 320 with the test camera 224 at an i-th position for a j-th pixel of the image produced by the display panel 102.

In a scaling step 432, the matrix of calibration coefficients A may be scaled by calculating a mean vector e(N) and a standard deviation vector s(N), and obtaining elements of a scaled matrix of calibration coefficients B(N×M) according to the formula B(ij)=(A(ij)−e(i))/s(i).

During a basis vectors step 434, basis vectors of the scaled matrix B are obtained. If the scaling step 432 has been omitted, the vector step 434 and further steps apply to the matrix of calibration coefficients A the same way as they are described below for matrix B. The test controller 210 may be configured to determine eigenvectors U(M×M) of a covariance matrix BTB and, then, to use the eigenvectors U of the covariance matrix BTB as right eigenvectors in a singular value decomposition (SVD) of the scaled matrix of calibration coefficients B so as to obtain the basis vectors. The basis vectors are mutually orthogonal, but not necessarily scaled to have the length of 1. Left eigenvectors of the SVD decomposition of B may be used as the basis vectors. Matrix of basis vectors F(N×M) may be calculated using the scaled calibration coefficients B and the eigenvectors of the covariance matrix BTB: F=BU.

A practical advantage of making eigen-decomposition of the covariance matrix BTB and not directly of matrix B is the reduced demand on computational resources, because usually N>>M. In some embodiments, the implementation of the basis vectors determination step 434 may include applying SVD function directly to the scaled matrix of calibration coefficients B, if the dimensionality of B and computational resources allow for that approach.

The basis vectors step 434 includes reduction of dimensionality by identifying a variance subspace responsible for the most of the variance of the dataset, leaving out of consideration a complementary subspace, which provides barely any variance of the dataset. The K-dimensional variance subspace, K<M, may be defined by K basis vectors of length N, orthogonal to one another, which may be arranged in a matrix H(N×K). The complementary subspace is defined by (M-K) basis vectors, each orthogonal to other basis vectors of both subspaces. The M-K basis vectors of the complementary subspace are not used in the display device. In other words, the M basis vectors may be divided into two groups of basis vectors defining two subspaces of the space formed by the scaled calibration coefficients, matrix B. The first subspace is the variation subspace and the second subspace is the complementary subspace, complementary to the variation subspace.

In practice, the matrix H(N×K) of the basis vectors forming the variance subspace may be formed from the full matrix of basis vectors F(N×M), by removing some columns. Matrix H may be formed by the first K columns of the matrix F, if the columns of matrix F are ordered so as to correspond to the non-decreasing order of eigenvalues in the matrix D in the eigen-decomposition of the covariance matrix BTB.

The basis vectors step 434 may include evaluation of eigenvalues of the covariance matrix BTB or singular values of the scaled matrix of calibration coefficients B, so as to exclude basis vectors associated with eigenvalues of BTB or singular values of B which are relatively close to zero and thus have negligible impact. The criterion may be that the K remaining basis vectors and corresponding eigenvalues are such that cumsum(diag(D))max(max(cumsum((diag(D)))), wherein D is the diagonal matrix in the decomposition of BTB and cumsum( ) is a cumulative sum of the main diagonal of D, is not less than a predefined threshold, e.g. 0.95. A variety of other criteria may be used, e.g. excluding basis vectors for which an absolute value of a ratio of a corresponding eigenvalue to the max eigenvalue (in D) is less than a predefined value. Alternatively, K may be set to a predefined value, K<M. Various implementations of principal component analysis may be used within the basis vectors step 434. In one embodiment, evaluation of eigenvalues or singular values is performed in parallel to determining the basis vectors one-by-one. Accordingly, not all of the M basis vectors are determined, but only those associated with relatively high eigenvalues of BTB or singular values of B.

Advantageously, the reduction in the number of basis vectors results in the reduction of storage space for the compressed approximation data approximating the dependence of the throughput. Accordingly, the basis vectors step 434 includes data compression based on the reduction of the dimensionality of the data obtained by the calibration system.

The disclosed approximation and compression rely on the fact that visual data has relatively low variability. By way of example, experiments with a test camera in 48 positions resulted in compressed data with 20 and even 15 basis vectors, i.e., M=48 has been replaced with K=20 and K=15 with sufficient quality of the images.

A step 438 includes determining reconstruction coefficients for future use by the display device. It may be done by projecting the test data, i.e. the scaled matrix of calibration coefficients B, onto the K basis vectors forming the matrix H so as to obtain a reconstruction coefficients matrix C(K×M) such as B=HC, or C=B\H.

In a storage step 340 (FIG. 3), the controller 210 stores the compressed approximation data representing the compressed approximation of the dependence of the optical throughput of the pupil expander, for subsequent use by the display device 100. The compressed approximation data includes the reconstruction coefficients C and the basis vectors H.

The aforedescribed calibration method enables the controller 110 of the display device 100 to obtain the compressed approximation data, which includes basis vectors and reconstruction coefficients representing a compressed approximation of the calibrated dependence, determine calibration data using the basis vectors and reconstruction coefficients, and apply the calibration data to the image to at least partially offset the dependence of the throughput of the pupil expander 106. The basis vectors obtained by the controller 110 are high-variance basis vectors, orthogonal to one another and forming a variance subspace of the space formed by the calibration coefficients defined on a grid of image points and a grid of positions or orientations at the eyebox. The high-variance basis vectors have associated eigenvalues greater than a predefined threshold as described above, while remaining basis vectors, forming a subspace complementary to the variance subspace, have associated eigenvalues less than or equal to the predefined threshold. The reconstruction coefficients obtained by the controller 110 are associated with the high-variance basis vectors obtained by the controller 110. The controller 110 may be further configured to determine reconstructed coefficients using the basis vectors and the reconstruction coefficients, the reconstructed coefficients having a variation greater than or equal to a variation of the dependence of optical throughput of the pupil expander 106 on the beam angle/beam coordinate at the eyebox.

Figure 5:
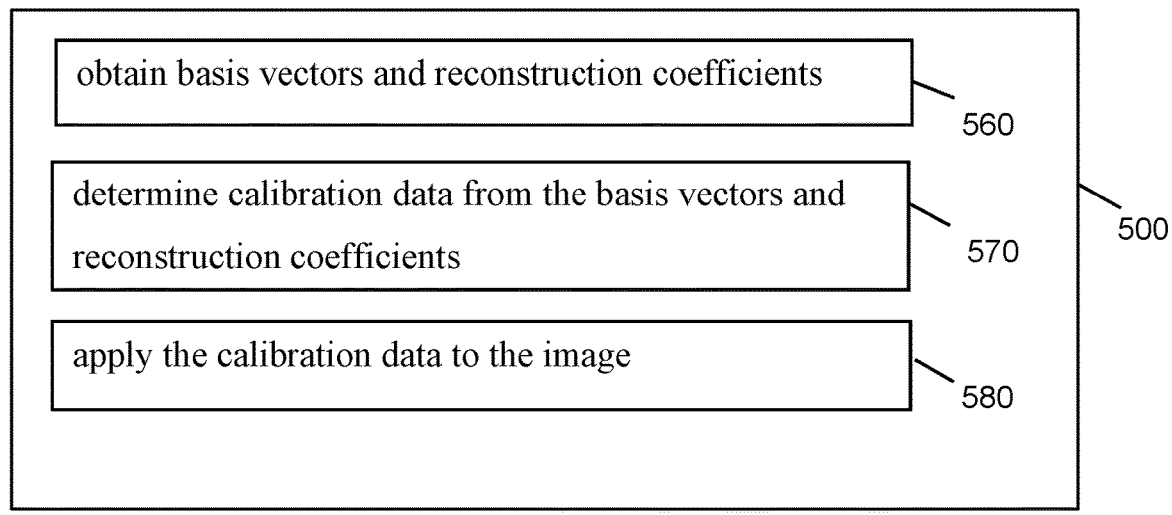
FIG. 5 is a flow chart of a method for decompressing the data determined by the calibration method of FIGS. 3 and 4 and modifying an image to be displayed based on the decompressed data.

FIG. 5 illustrates an image light modification method 500 using reconstruction of the data determined by the calibration method 300 and including the basis vectors and reconstruction coefficients as described above. The data is obtained from the calibration coefficients which define, i.e. describe, approximate, or represent, the dependence of the throughput of the pupil expander on the beam angle or beam coordinate at the eyebox at M grid points of eye pupil positions at the eyebox and N grid points of the image (the N pixels).

The image modification method 500 includes a data obtaining step 560, performed by the controller of the display device, such as the controller 110 of the display device 100 of FIG. 1 including the pupil expander 106. The controller 110 is configured to obtain the basis vectors and the reconstruction coefficients determined during the approximation step 330 and representing the compressed approximation of the dependence of the optical throughput of the pupil expander 106 on a beam angle and a beam coordinate at the eyebox 108. The controller 110 can obtain the basis vectors and the reconstruction coefficients for further use from its own memory, from memory of the display device external to the controller, from an external source, etc.

In a reconstruction step 570, the controller determines calibration data using the basis vectors and the reconstruction coefficients, multiplying the basis vectors with the reconstruction coefficients, for applying to the image to at least partially offset the dependence of optical throughput of the pupil expander 106 on a beam angle and a beam coordinate at the eyebox 108. The calibration data determined in the display device may be envisioned as an approximation, or a function of the calibration coefficients obtained by the calibration system 200 during the dependence measurement step 320. The test data has been compressed by excluding low-variation data as described above.

In the reconstruction step 570, the controller 110 may determine a position of a user's eye 134 at the eyebox 108 with the help of the eye tracking system 112 (FIG. 1) operably coupled to the controller for determining eye pupil position at the eyebox. Then, the controller 110 determines calibration data for each pixel of the image source 102 viewed from the particular eye position determined using the eye tracking system 112.

When the particular eye position at the eyebox 108 is at or sufficiently close to one of the grid points of eye pupil positions at the eyebox, the calibration data for the N grid points of the image may be determined by directly using the compressed approximation data and multiplying the basis vectors and reconstruction coefficients. The calibration data determined at the display device 100 corresponds to the plurality of calibration coefficients determined at the calibration system 200. Each of the calibration data values relates to the same grid position as the corresponding calibration coefficient, and approximates a corresponding calibration coefficient.

The calibration data obtained for the N grid points of the image, further referred to as restored coefficients, may be used for determining calibration data for other pixels of the image. The restored coefficients determined at the display device 100 correspond to the plurality of calibration coefficients determined at the calibration system 200. Each of the restored coefficients relates to the same grid position as the corresponding calibration coefficient, and approximates a corresponding calibration coefficient.

Figure 6:
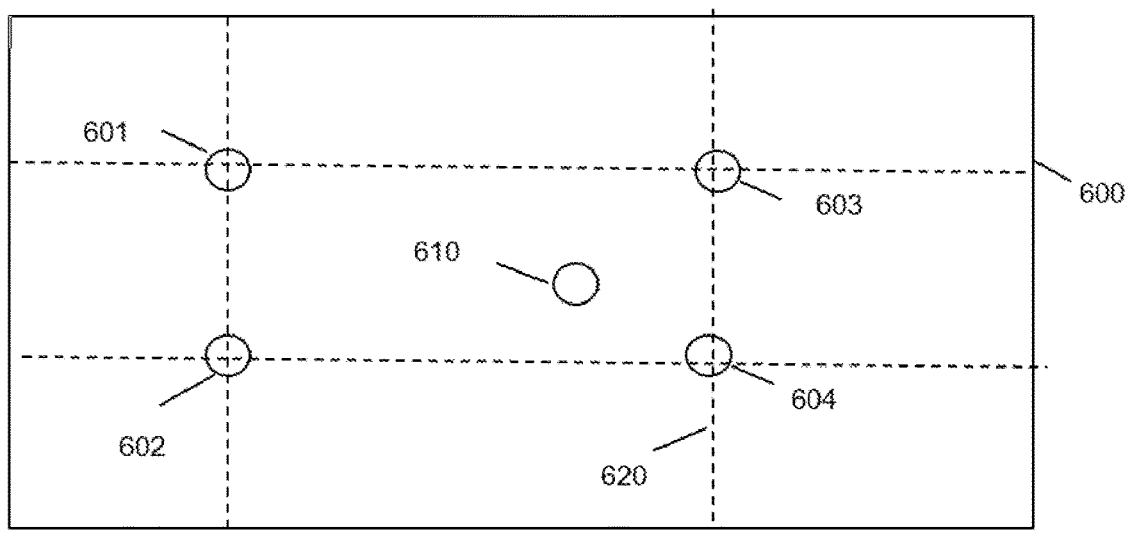
FIG. 6 is an illustration of image grid interpolation.

The calibration data for other pixels of the image may be determined using interpolation of the restored coefficients over a grid of image points. FIG. 6 illustrates image grid interpolation in a portion 600 of the image produced by the image source 102. Pixels 601-604 belong to a grid 620 of N image points for which the calibration coefficients have been determined. A pixel 610 is not on the grid 620. A calibration data value for pixel 610 may be determined by obtaining restored coefficients (calibration data) e.g. for the pixels 601-604, and interpolating the restored coefficients obtained for the pixels 601-604. The interpolation may involve more pixels, can be linear, bicubic, etc., and can be implemented as interpolation of the calibration data before or after the basis vectors are multiplied with the reconstruction coefficients.

If the particular eye position at the eyebox 108 does not belong to, or is not sufficiently close to one of the grid points of eye pupil positions at the eyebox, the calibration data for the particular eye position may be determined using interpolation of the restored coefficients over grid points of the eye position grid.

Figure 7:
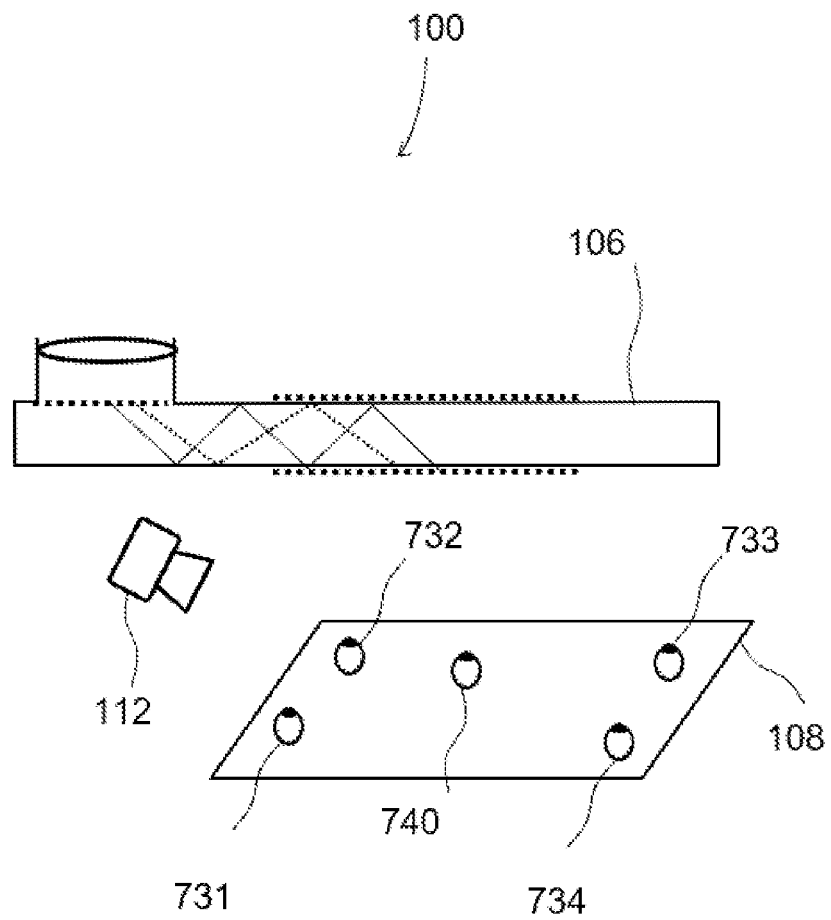
FIG. 7 is an illustration of interpolation over the eye position grid.

FIG. 7 illustrates interpolation over the eye position grid using the display device 100 of FIG. 1 as an example. The eyebox 108 is shown in a different perspective for illustration purposes. Human eye positions 731-734 belong to the grid of eye positions for which the calibration coefficients have been determined. An eye position 740 is not on the grid, and the calibration data value for the position 740 may be determined by obtaining a plurality of restored coefficients at the grid positions using the basis vectors and the reconstruction coefficients, the plurality of restored coefficients corresponding to the plurality of calibration coefficients, and interpolating the restored coefficients (calibration data) obtained, e.g., for the positions 731-734. The interpolation may involve more positions, can be linear, bicubic, etc., and can be implemented as interpolation of the calibration data before or after the basis vectors are multiplied with the reconstruction coefficients.

Alternatively, the calibration data value for the position 740 may be determined as follows: determine interpolated reconstruction coefficients for the particular eye pupil position 740, by interpolating the reconstruction coefficients between the grid positions such as the positions 731-734; and, determine the calibration data for the position 740, which involves multiplying the basis vectors with the interpolated reconstruction coefficients determined for the position 740.

Obtaining other values of the calibration data may require the interpolation over the eye position grid and the interpolation over the grid of image points, which may be used together. Variety of interpolation methods may be applied.

In a modification step 580 (FIG. 5), the controller 110 causes the calibration data to be applied to the image, so as to at least partially offset the dependence of the throughput on the beam angle, e.g., by pre-emphasizing the image to be displayed in areas of low throughput, attenuating the image in areas of high throughput, or both.

Comparison has been made between direct use of the calibration coefficients in the display device and the use of the calibration data obtained with compression/reconstruction of the calibration coefficients as discussed above. The image source 102 was sampled at 112×72 pixels, N=8,064. The test camera 224 was moved to N=48 positions. The criterion for compression was excluding basis vectors responsible for less than 5% of variations in the image, resulting in K=20.

For a single channel with the storage required for the calibration coefficients of 116×72×6×8 bytes, the storage required for the compressed calibration data was estimated as 116*72*22+48*20 bytes, i.e., the improvement was more than two-fold. While the compression and reconstruction required additional operations, most of them were performed only at the calibration system 200, out of the regular use of the display device. One estimation for the number of operations performed at the display device using the compressed data is 1,018,464 compared to 967,860 operations when the display device uses the calibration coefficients without compression. A significant reduction of the storage requirements is achievable at a cost of only a slight increase in the number of required operations.

A color image may be represented by brightness maps for several color channels, for example red (R), green (G), and blue (B) color channels. Each of these color channels may be represented by a 2D table of corresponding sub-pixel brightness, for example R sub-pixel brightness, G sub-pixel brightness, and B sub-pixel brightness. The calibration data as discussed above can be provided for each of these channels. Alternatively, the channel data may be recomputed into luminance or brightness data and color coordinate data. Separate corrections may be applied to luminance variation reduction and to color coordinate variation reduction due to imperfections of the waveguide pupil replicators illustrated above. A color coordinate is typically described by a pair of numbers defining a coordinate of a particular color in a color space of choice, e.g. XYZ, CIELAB, YDbDr, etc.

The controller 110 may be configured to adjust a distribution of optical power density of the luminance channel, depending on position of the user's eye 134 determined by the eye tracking system 112, to at least partially offset the angular-dependent power throughput of the pupil expander 106. The controller 110 may be further configured to adjust a variation of the color shade introduced by the pupil expander 106 due to different colors being attenuated differently.

Figure 8:
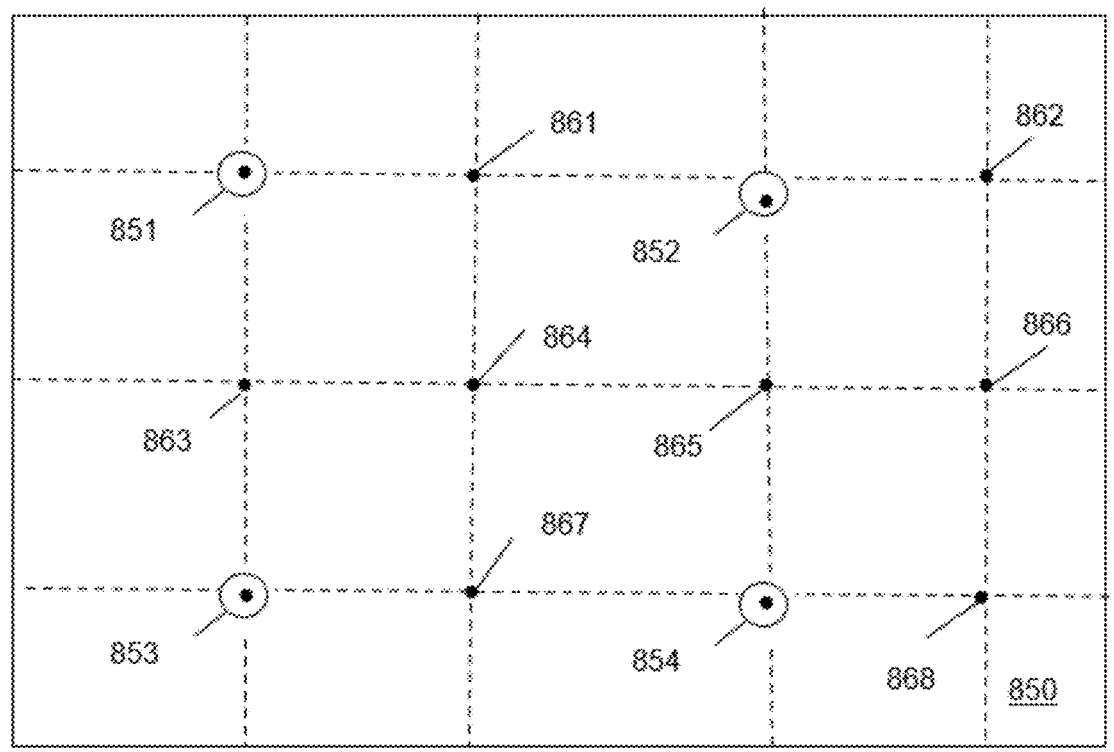
FIG. 8 is an illustration of an image portion with grid points of two grids.

The number of grid points in the image for a brightness channel (luminance, luma, etc., depending on the color space used) may differ from the number of grid points for a color coordinate channel or channels. More than one grid may be used to sample the same image. FIG. 8 illustrates an image portion 850, wherein pixels 851-854 and 861-868, which are grid points of a first grid, are denoted by black dots, while pixels 851-854, which are grid points of a second grid, are denoted by white circles around some of the dots. In this example, the two grids differ in the numbers of points and, thus, in distance between grid points. The first grid is denser and may be used for a brightness channel, while the second, less dense grid may be used for color coordinate channel(s). This reflects on the fact that the human vision resolves spatial details in brightness much better than in color. The example also shows that some pixels may serve as grid points of more than one grid.

In an embodiment, the dependence of the throughput of the pupil expander on the beam angle or beam coordinate at the eyebox may be defined using a plurality of brightness coefficients and a plurality of color coefficients. Each brightness coefficient corresponds to a point of a brightness grid of points of the image. Two or three color coefficients may correspond to a point of a color grid of points of the image. Because the human eye is more sensitive to the change in brightness than in color, the data related to color may not need to be as spatially detailed as the data related to brightness of the image. In other words, the color grid of points may have less points than the brightness grid of points. Advantageously, the amount of the calibration data may be reduced by having the color grid have less points than the brightness grid.

The calibration data for brightness and for each of the color channels may be determined as discussed above with reference to FIGS. 2 to 5. The method performed in the display device 100 includes: obtaining basis vectors and reconstruction coefficients representing a compressed approximation of a dependence of optical throughput of the pupil expander on a beam angle and a beam coordinate at the eyebox; obtaining calibration data from the basis vectors and reconstruction coefficients, for applying to the image to at least partially offset the dependence; and applying the calibration data to the image. The method provides basis vectors and reconstruction coefficients for each channel. The plurality of basis vectors saved for use in the display device includes a plurality of basis vectors for the brightness channel and pluralities of basis vectors for color coordinates. Similarly, the plurality of reconstruction coefficients saved for use in the display device includes a plurality of reconstruction coefficients for the brightness channel and pluralities of reconstruction coefficients for the color coordinates.

For calibrating the brightness change and color shift, the controller may be configured to obtain a plurality of restored brightness coefficients at the brightness grid points from the basis vectors and the reconstruction coefficients determined for the brightness channel. The controller may be further configured to obtain a plurality of restored color coordinate coefficients at the color grid points from the basis vectors and the reconstruction coefficients determined for the color coordinate coefficients.

A memory, e.g., an on-board non-volatile memory, may be provided in the display device 100, for storing the calibration data for modifications of the brightness channel and the color coordinates of the image at each pupil position at the eyebox 108. The controller 110 may be operably coupled to the memory for retrieving at least a portion of the calibration data corresponding to the pupil position determined by the eye tracking system 112, for modifying the brightness and/or color distribution of the image to at least partially offset the angular-dependent brightness and/or color transfer function of the pupil expander 106.

Figure 9:
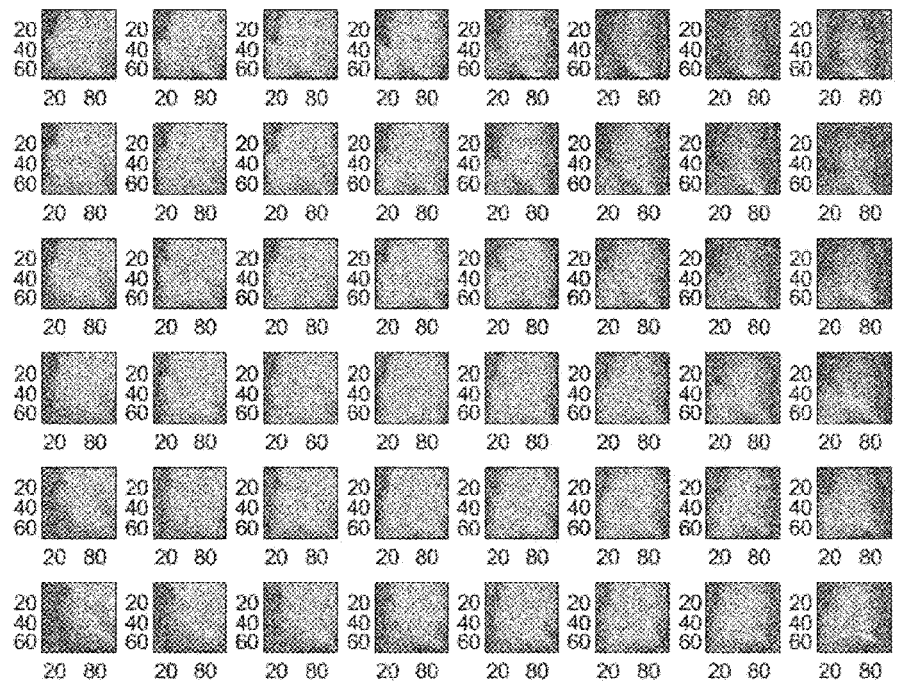
FIG. 9 shows original and restored correction maps of a red color channel of the image.
Figure 9:
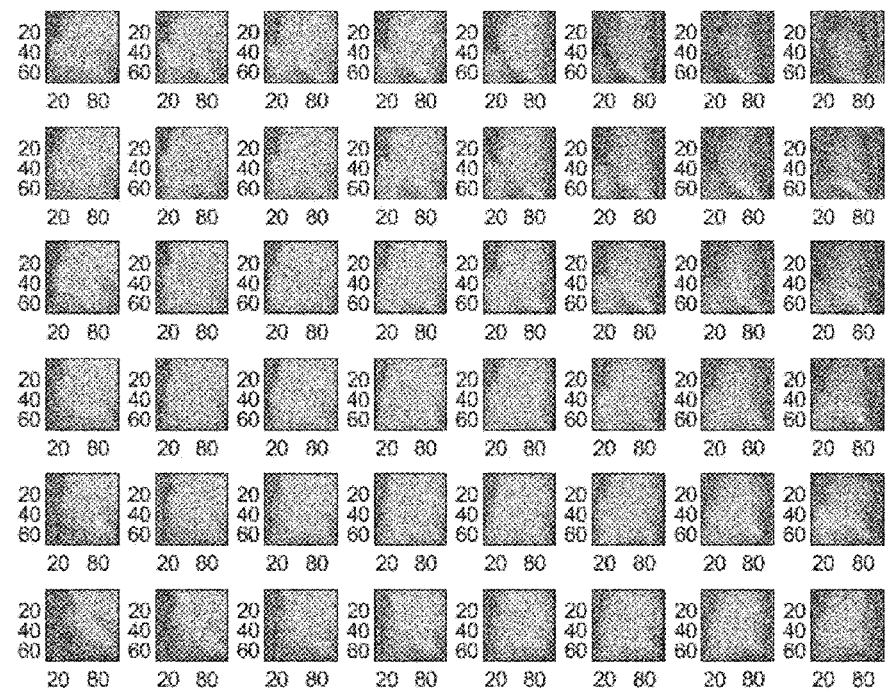
Figure 10:
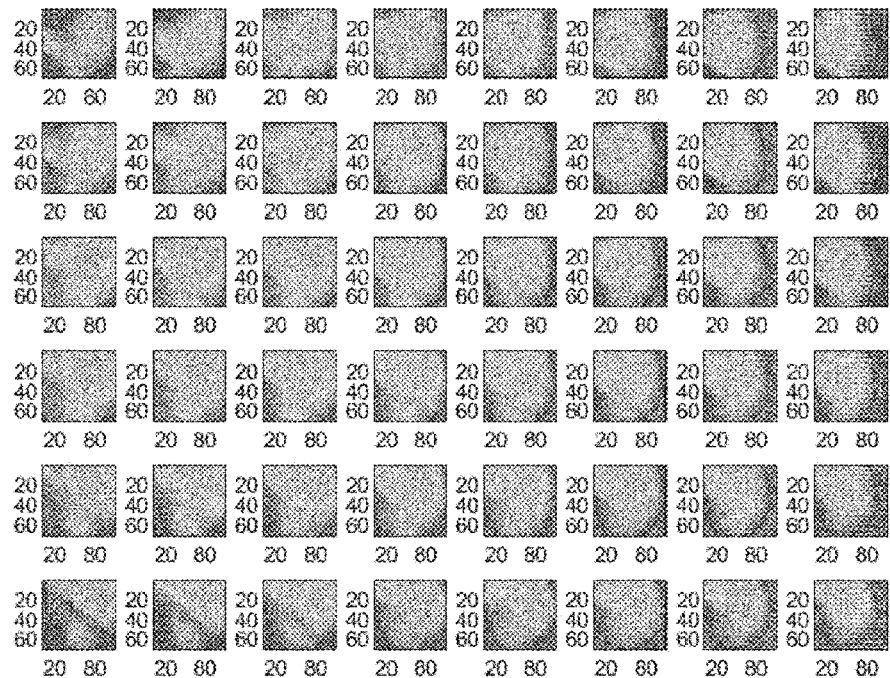
FIG. 10 shows original and restored correction maps of a green color channel of the image.
Figure 10:
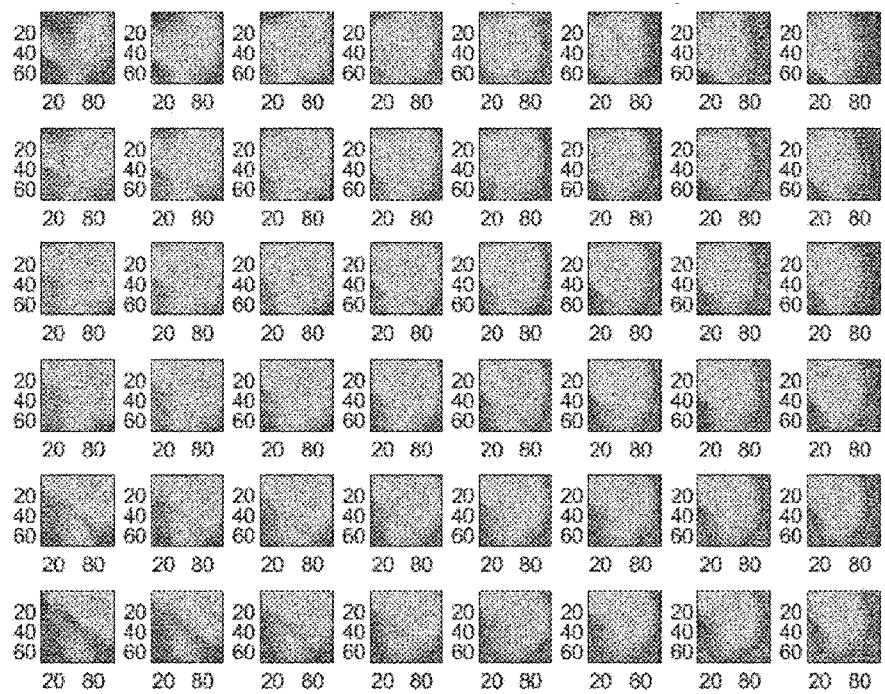
Figure 11:
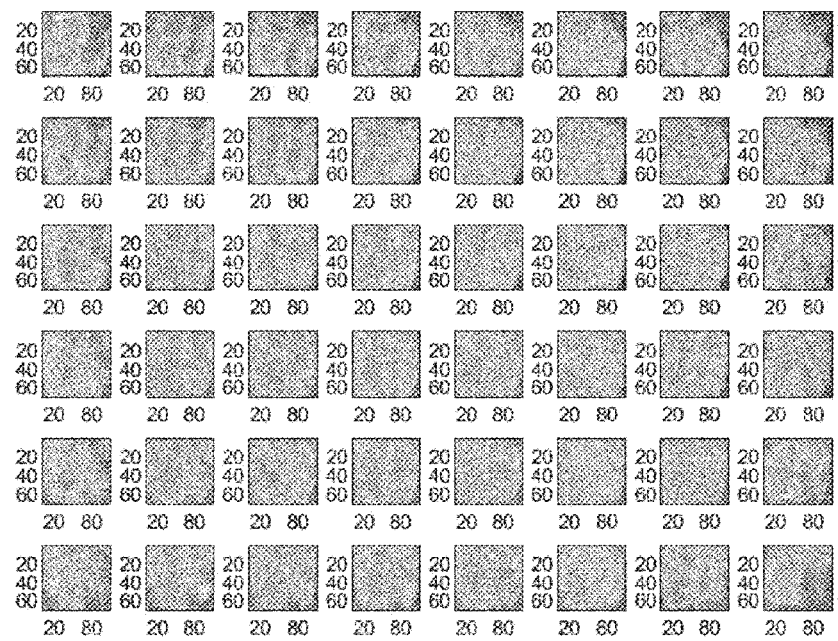
FIG. 11 shows original and restored correction maps for a blue color channel of the image.
Figure 11:
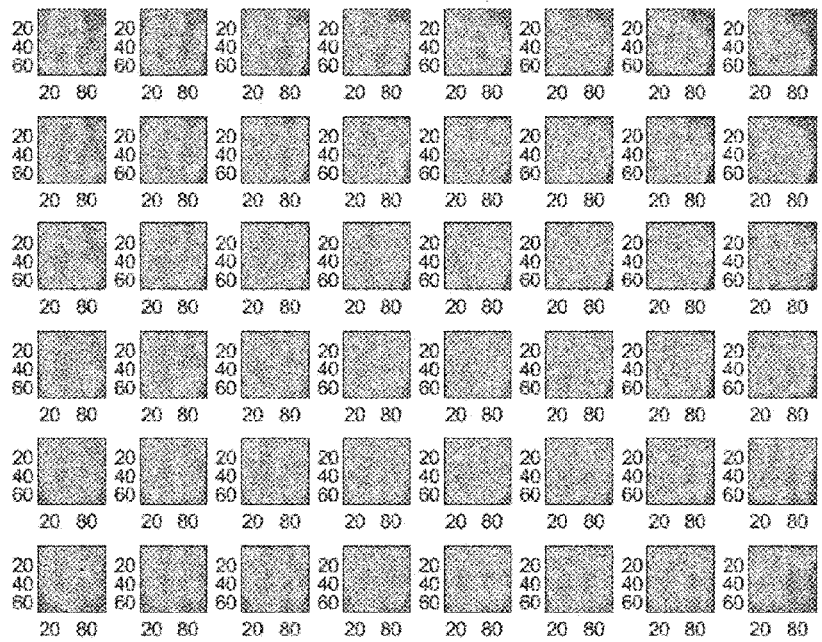

FIGS. 9, 10, and 11 provide a comparison of correction maps for the channels of the Red/Green/Blue (RGB) color space: red, green, and blue, respectively, for a plurality of eyebox positions at a 8×6 grid of positions, the positions of the correction maps corresponding to the positions of the eye in the 8×6 grid in the eyebox. The coordinates in the correction maps are image coordinates. A correction map formed directly from the calibration coefficients is at the top of the drawing, and a correction map formed of the calibration data obtained by the compression/reconstruction method disclosed above with K=20 is in the lower part of the drawing. All the data is scaled from 0 to 1 and grey-shade coded. One can see by comparing respective shaded squares that the correction maps were restored adequately for all color channels and for all grid positions.

In an embodiment, a color image displayed by the display panel 102 may be described in a luminance chrominance color space (YCbCr), and represented by three channels: a luma component Y and two color components Cb (blue-difference) and Cr (red-difference). Accordingly, the dependence of the throughput of the pupil expander on the beam angle or beam coordinate at the eye box may be defined by calibration coefficients, which include a plurality of brightness coefficients corresponding to the luma component of the YCbCr color space and two pluralities of color coefficients corresponding to the blue-difference and red-difference chroma components of the YCbCr color space, respectively. The pluralities of basis vectors and reconstruction coefficients obtained by the display device pluralities of basis vectors and reconstruction coefficients corresponding to the three components: Y, Cr, and Cb.

The human eye is less sensitive to spatial variations of color compared to spatial variations of brightness. Thus, a grid of image points used to determine the compressed approximation of a dependence of the throughput of the pupil expander on the beam angle or beam coordinate at the eye box in Cr or Cb components may have fewer points than a grid of image points used for the luma component or channel. Accordingly, less storage will be required for the basis vectors and the reconstruction coefficients stored in the display device for the Cr or Cb channel than for the luma channel. Therefore, using the YCbCr color space instead of the RGB color space may result in additional compression of data.

By way of example, the compression of about 4.5 times may be achieved by using the high-variance vectors described above in combination with the YCbCr color space, wherein the calibration coefficients for the Y component have been determined for N1=112×72 pixels in a first grid of image points, while the calibration coefficients for the Cr and Cb components have been determined for N2=56×36 pixels in a second grid of image points. The number of positions in a grid of positions was M=48, and the number of basis vectors used for reconstruction of each of the channels was K=20. The total compression effect was contributed to by representation of the calibration coefficients with basis vectors, reducing the number of the basis vectors, and using shorter basis vectors in the Cr and Cb channels due to reduction of the measured pixels, i.e., the reduced size of the second grid of image points.

Figure 12:
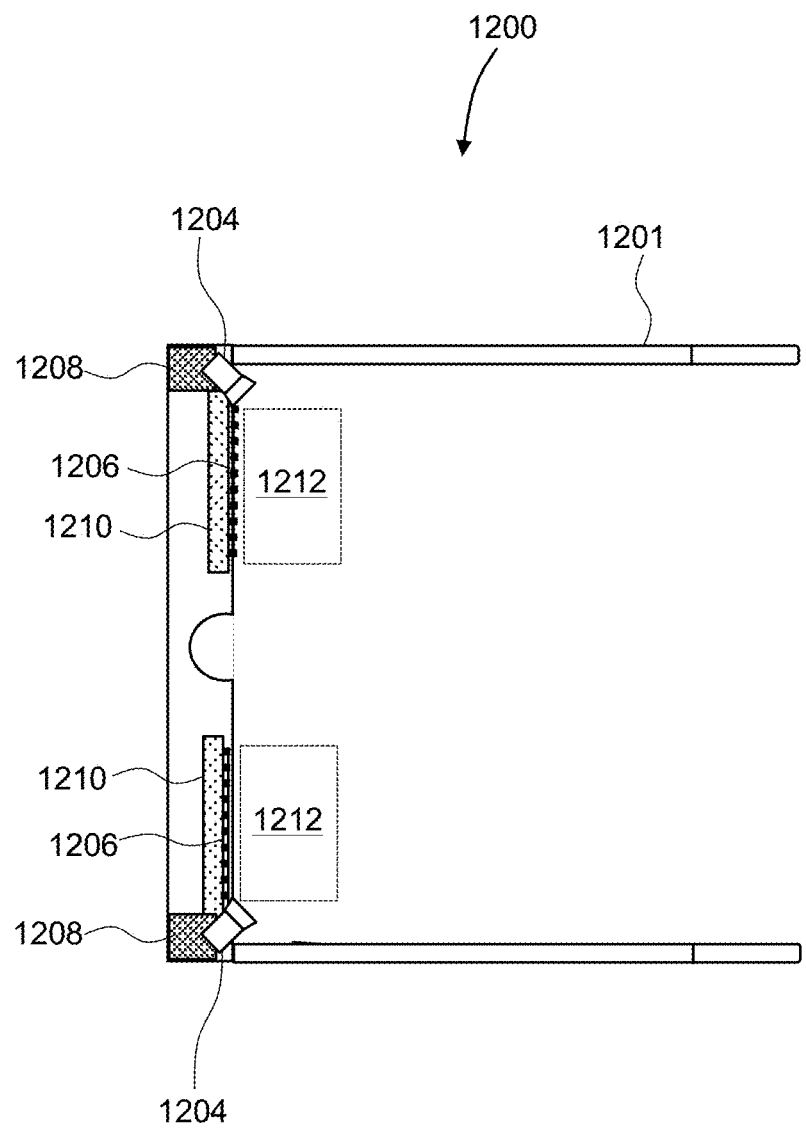
FIG. 12 is an isometric view of a near-eye AR/VR display.

The display device 100 (FIG. 1) may be implemented as an augmented reality (AR) near-eye display 1200 illustrated in FIG. 12. The display 1200 includes a frame 1201 having a form factor of a pair of eyeglasses. The frame 1201 supports, for each eye: a projector 1208, a pupil-replicating waveguide 1210 optically coupled to the projector 1208, an eye-tracking camera 1204, and a plurality of illuminators 1206. The illuminators 1206 may be supported by the pupil-replicating waveguide 1210 for illuminating an eyebox 1212. The projector 1208 provides a fan of light beams carrying an image in angular domain to be projected into a user's eye. The pupil-replicating waveguide 1210 receives the fan of light beams and provides multiple laterally offset parallel copies of each beam of the fan of light beams, thereby extending the projected image over the eyebox 1212. The pupil-replicating waveguide 1210 may also be referred to as a pupil expander and correspond to the pupil expander 106 of the display device 100 of FIG. 1.

For AR applications, the pupil-replicating waveguide 1210 can be transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 1204 is to determine location and/or orientation of both eyes of the user. Once the positions of the user's eyes are known, eye pupil locations, as well as a gaze convergence distance and direction may be determined. The eye pupil locations may be used to adjust the display calibration in real time, as described above. The gaze direction/vergence may be used to adjust the imagery displayed by the projectors 1208, for a better fidelity of immersion of the user into the displayed augmented reality scenery, and/or to provide specific functions of interaction with the augmented reality. In operation, the illuminators 1206 illuminate the eyes at the corresponding eyeboxes 1212, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1212.

In some embodiments, the image processing and eye position/orientation determination functions may be performed by a central controller, not shown. The central controller may also provide control signals to the projectors 1108 to generate the images to be displayed to the user, depending on the determined eye positions, eye orientations, gaze directions, eyes vergence, etc.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display device comprising:
 a projector for providing image light carrying an image in angular domain for displaying by the display device;
 a pupil expander operably coupled to the projector for relaying the image light to an eyebox of the display device, wherein optical throughput of the pupil expander has a first dependence on a beam angle and a beam coordinate at the eyebox; and
 a controller operably coupled to the projector and configured to:
 obtain basis vectors and reconstruction coefficients representing a compressed approximation of the first dependence;
 determine calibration data from the basis vectors and the reconstruction coefficients, for applying to the image to at least partially offset the first dependence; and
 apply the calibration data to the image.

2. The display device of claim 1, wherein the controller is configured to multiply basis vectors with the reconstruction coefficients for determining the calibration data.

3. The display device of claim 1, wherein the first dependence is defined by a plurality of calibration coefficients at grid points of the image, wherein the controller is configured to:
 obtain a plurality of restored coefficients at the grid points from the basis vectors and the reconstruction coefficients, the plurality of restored coefficients corresponding to the plurality of calibration coefficients; and
 determine the calibration data by interpolating the restored coefficients between the grid points.

4. The display device of claim 1, further comprising an eye tracking system operably coupled to the controller for determining a particular eye pupil position at the eyebox, wherein the first dependence is defined by a plurality of calibration coefficients at grid points of eye pupil positions at the eyebox, wherein the controller is configured to:
 determine interpolated reconstruction coefficients for the particular eye pupil position, by interpolating the reconstruction coefficients between the grid points; and
 determine the calibration data by multiplying the basis vectors with the interpolated reconstruction coefficients.

5. The display device of claim 1, wherein the first dependence is defined by a plurality of brightness coefficients, each brightness coefficient corresponding to a point of a brightness grid of points of the image, and a plurality of color coefficients, two color coefficients corresponding to a point of a color grid of points of the image, wherein the controller is configured to:
 obtain a plurality of restored brightness coefficients at the brightness grid points from the basis vectors and the reconstruction coefficients; and obtain a plurality of restored color coordinate coefficients at the color grid points from the basis vectors and the reconstruction coefficients;

wherein the color grid of points has less points than the brightness grid of points.

6. The display device of claim 5, wherein the first dependence is defined in YCbCr color space, wherein the brightness coefficients correspond to a luma component of the YCbCr color space, and the color coefficients correspond to blue-difference and red-difference chroma components of the YCbCr color space.

7. The display device of claim 1, wherein the basis vectors are eigenvectors of a plurality of calibration coefficients at grid points of the image.

8. The display device of claim 1, wherein the controller is configured to determine reconstructed coefficients using the basis vectors and the reconstruction coefficients, the reconstructed coefficients having a variation greater than or equal to a variation of the first dependence.

9. A calibration system for calibrating a display device comprising a projector for providing image light carrying an image in angular domain, and a pupil expander operably coupled to the projector for relaying the image light to an eyebox of the display device, the calibration system comprising:

a test camera for receiving the image light from the pupil expander, wherein at least one of the pupil expander or the test camera is movable to change a position of the test camera at the eyebox; and a test controller operably coupled to the test camera and the display device and configured to:

cause the display device to display a calibration frame;

determine a first dependence of optical throughput of the pupil expander on a beam angle and a beam coordinate at the eyebox, by obtaining at least one image of the calibration frame with the test camera;

determine basis vectors and reconstruction coefficients representing a compressed approximation of the first dependence; and store the basis vectors and the reconstruction coefficients for subsequent access by the display device.

10. The calibration system of claim 9, wherein the test controller is configured to determine the reconstruction coefficients by projecting test data representing the first dependence onto the basis vectors.

11. The calibration system of claim 10, wherein the test controller is configured to determine eigenvectors of a covariance matrix of the test data for determining the basis vectors.

12. The calibration system of claim 9, wherein the first dependence is defined by a plurality of brightness coefficients, each brightness coefficient corresponding to a point of a brightness grid of points of the image, and a plurality of color coefficients, two color coefficients corresponding to a point of a color grid of points of the image, wherein the test controller is configured to:

determine basis vectors and reconstruction coefficients representing a compressed approximation of the plurality of brightness coefficients; and determine basis vectors and reconstruction coefficients representing a compressed approximation of the plurality of color coefficients;

wherein the color grid of points has less points than the brightness grid of points.

13. The calibration system of claim 12, wherein the first dependence is defined in YCbCr color space, wherein the brightness coefficients correspond to luma component of the YCbCr color space, and the color coefficients correspond to blue-difference and red-difference chroma components of the YCbCr color space.

14. The calibration system of claim 9, wherein the basis vectors are eigenvectors of a plurality of calibration coefficients at grid points of the image.

15. A method in a display device comprising a projector for providing image light carrying an image in angular domain, and a pupil expander operably coupled to the projector for relaying the image light to an eyebox of the display device, the method comprising:

obtaining basis vectors and reconstruction coefficients representing a compressed approximation of a first dependence of optical throughput of the pupil expander on a beam angle and a beam coordinate at the eyebox;

obtaining calibration data from the basis vectors and reconstruction coefficients, for applying to the image to at least partially offset the first dependence; and applying the calibration data to the image.

16. The method of claim 15, wherein obtaining the basis vectors and the reconstruction coefficients comprises:

using a calibration system to cause the display device to display a calibration frame;

determining the first dependence of optical throughput of the pupil expander on a beam angle and a beam coordinate at the eyebox, by obtaining at least one image of the calibration frame with a test camera of the calibration system;

obtaining the basis vectors using a covariance matrix of test data representing the first dependence;

obtaining the reconstruction coefficients by projecting the test data onto the basis vectors; and storing the basis vectors and the reconstruction coefficients for subsequent access by the display device.

17. The method of claim 15, wherein the first dependence is defined by a plurality of calibration coefficients at grid points of the image, the method further comprising:

obtaining a plurality of restored coefficients at the grid points from the basis vectors and the reconstruction coefficients, the plurality of restored coefficients corresponding to the plurality of calibration coefficients; and obtaining the calibration data by interpolation the restored coefficients between the grid points.

18. The method of claim 15, wherein the first dependence is defined by a plurality of calibration coefficients at a grid of locations at the eyebox, the method further comprising:

obtaining a plurality of restored coefficients at the grid of locations from the basis vectors and the reconstruction coefficients, the plurality of restored coefficients corresponding to the plurality of calibration coefficients; and obtaining the calibration data by interpolation the restored coefficients between locations of the grid of locations.

19. The method of claim 15, wherein the first dependence is defined by a plurality of calibration coefficients at grid points of eye pupil positions at the eyebox, the method further comprising:

determine interpolated reconstruction coefficients for a particular eye pupil position, by interpolating the reconstruction coefficients between the grid points; and, determine the calibration data by multiplying the basis vectors with the interpolated reconstruction coefficients.

20. The method of claim 15, wherein the basis vectors are eigenvectors of a plurality of calibration coefficients at grid points of the image, and wherein the calibration data has a variation greater than or equal to a variation of the first dependence.

* * * * *